(12) United States Patent
Mihaljov

(10) Patent No.: US 6,501,550 B1
(45) Date of Patent: Dec. 31, 2002

(54) METHOD FOR IMPROVING THE ACCURACY OF MEASUREMENTS MADE USING A LASER INTERFEROMETER

(76) Inventor: Leonid Mihaljov, Joroinen (FI)

(*) Notice: Subject to any disclaimer, the term of this patent is extended or adjusted under 35 U.S.C. 154(b) by 40 days.

(21) Appl. No.: 09/590,296

(22) Filed: Jun. 9, 2000

Related U.S. Application Data

(62) Division of application No. PCT/FI99/00978, filed on Nov. 26, 1999.

(30) Foreign Application Priority Data

Dec. 2, 1998 (FI) .................................................. 982603

(51) Int. Cl.[7] .............................................. G01B 9/02
(52) U.S. Cl. ...................................... 356/450; 356/517
(58) Field of Search ................................. 356/450, 517

(56) References Cited

U.S. PATENT DOCUMENTS

| | | |
|---|---|---|
| 4,751,689 A | 6/1988 | Kobayashi |
| 5,287,627 A | 2/1994 | Rando |
| 5,624,188 A | 4/1997 | West |

FOREIGN PATENT DOCUMENTS

| | | |
|---|---|---|
| EP | 0 417 934 A2 | 3/1991 |
| GB | 2 170 907 | 8/1986 |
| WO | WO 97/43661 | 11/1997 |

*Primary Examiner*—Frank G. Font
*Assistant Examiner*—Andrew H. Lee
(74) *Attorney, Agent, or Firm*—Pillsbury Winthrop LLP

(57) ABSTRACT

The object of this invention is to provide a method for improving the accuracy of measurements, distance measurements in particular, made using a laser interferometer (1, 2). The method according to this invention consists of determining the air temperature along the whole path of the laser beam (3) emitted by the laser interferometer by measuring the speed of sound (5) travelling the same path, and using the resulting value to calculate the air temperature dependent adjustment on the measured value, distance measurement values in particular.

14 Claims, 2 Drawing Sheets

Figure 1:
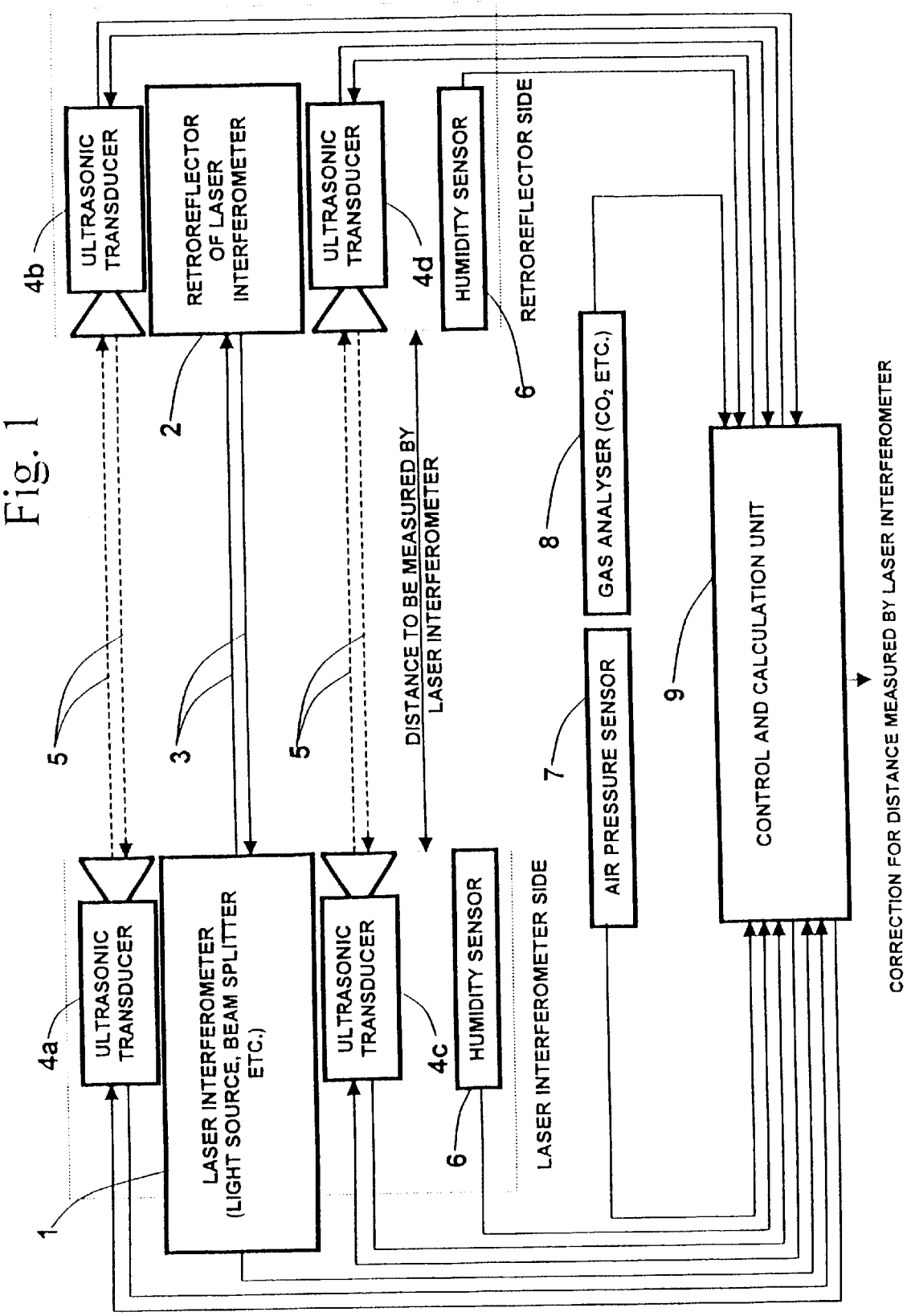

METHOD FOR IMPROVING THE ACCURACY OF MEASUREMENTS MADE USING A LASER INTERFEROMETER

This application is a continuation of PCT/8199/00978 filed Nov. 26, 1999.

The object of this invention is to provide a method for improving the accuracy of measurements, distance measurements in particular, made when using a laser interferometer.

When precise measuring accuracy is required, for example in the engineering industry, laser interferometers are used in distance measuring because they are more accurate than other methods. However, the accuracy of the laser interferometer depends on various factors, such as the dependency of the laser beam wavelength on the refractive index of the medium. Since distance measurements made using laser interferometers are based on the wavelength of light, it is essential to know the refractive index of the medium to obtain sufficiently accurate results. In practice, the medium in these measurements is air whose refractive index is a function of air pressure, temperature, humidity, and concentrations of gases such as carbon dioxide. Air temperature changes significantly due to the fast and constant movements of air masses caused by temperature differences between the various points in the measurement region and due to aerodynamic effects. Because of changes in air temperature, the integral transient temperature along the laser beam path of the laser interferometer cannot be accurately measured with the currently known thermometers used in laser interferometers.

In commercially available laser interferometer equipment, the refractive index of the air is determined by measuring the above quantities in air and then calculating their effects on the wavelength. For this purpose, the currently available equipment incorporate sensors to measure air temperature, pressure, and sometimes also humidity. Typically, there are one to three thermometers for air temperature measurement.

The air thermometers currently used in laser interferometers are based on the phenomenon that the sensor temperature becomes the same as the ambient air temperature. These thermometers only allow measuring of temperatures at single points adjacent to the laser beam path. These thermometers cannot measure temperatures at each point along the whole laser beam path, as is actually required. Another disadvantage is that, due to delays in the response times in the currently known temperature sensors of laser interferometers, the measurement results always lag behind the real instantaneous temperature at each measurement point. Consequently, these devices only allow measuring of integral temperature values at specific measurement points during a specific period of time; they do not allow measuring of constantly changing transient temperatures. Applying measurement methods which only allow measuring of temperature values at single points and with a long response time, and considering the resulting values as the integral instantaneous temperature along the whole laser beam path, results in an error which is the most significant among the error components affecting the accuracy of laser interferometer measurements.

The object of this invention is to provide a method and equipment which solve the problem above. In addition, this invention provides a method for correcting the laser interferometer measurement results, taking into account the transient changes in air temperature along the whole laser beam path.

The object of this invention can be achieved by using a method whose distinctive aspects are described in the claims.

The method according to this invention consists of determining the air temperature values along the whole laser beam path of the laser interferometer by measuring the speed of sound travelling the same path, and using the obtained value to calculate the correction depending on air temperature to the measured value, particularly to distance measurements. The expression 'same path' means here that the soundwaves and laser light waves start from the same point or, in practice, from points near each other, and arrive at the same point or, in practice, at points near each other, and that these waves travel simultaneously. The correction to the laser interferometer measurement result, particularly to the distance measurement result, can be calculated from the air temperature value. This method gives an accurate picture of the transient air characteristics which affect the accuracy of the laser interferometer.

In an embodiment according to this invention, the speed of sound is measured using the value of length or distance measured simultaneously using a laser interferometer. When the method according to this invention is used, the accuracy of the measurements made using a laser interferometer improves considerably. The described method can be applied to commercially available laser interferometers without alterations or modifications and the equipment according to this invention can also be installed to them. In addition, the method and equipment are simple and inexpensive to implement, also the equipment is inexpensive to produce and to use.

This invention is based on the phenomenon that the refractive index of the medium (in practice, air) known from the wave theory of light, which affects the wavelength of the laser beam, and the speed of sound in air, known from the theory of acoustics, both depend on the same factors, namely air pressure, temperature, humidity, and concentration of carbon dioxide, and are thus comparable to each other in a known manner. A further advantage is that the soundwaves do not interfere with the laser light beam transmitted by the laser interferometer and it is possible for the soundwaves and the laser beam to travel the same path simultaneously. Thus, transient changes in air characteristics have the same effect on the soundwaves and the given laser beam. Since the relative effect of a change in air temperature, is over 1000 times stronger on the speed of sound in air than on the refractive index of air, it is possible to achieve very precise measurements.

The method according to this invention proposes that the determination of the correction to the length measurement result, which depends on the air temperature along the path of the laser beam and which is obtained with the laser interferometer, is based on the fact that when sound wave travels the same path as the laser beam through air, instantaneous air temperature at each point along the path affects the speed of sound wave. The time that the soundwave takes to travel through air is inversely proportional to the integral instantaneous temperature along the soundwave path. Besides air temperature, the speed of sound in air depends on other factors, the effect of which is tens or hundreds of times smaller than the effect of air temperature. These factors have a relatively uniform effect on the air conditions in the whole region, unlike air temperature which changes significantly from point to point and varies with time. These factors include air humidity, pressure and concentrations of different gases such as carbon dioxide.

A further advantage provided by the invention measurement method is that the response time is zero at each point of the laser beam path and measurement of the whole laser beam path only lasts the time that the soundwave takes to travel the path. This is the essential difference and overwhelming advantage in the principle of the proposed method compared to the slower air thermometers currently used in laser interferometers.

In a preferable embodiment of this invention, the sound transmitters and receivers are located in the laser interferometer or in its proximity so that the path and axis of the laser beam and soundwaves are as close to each other as possible and the soundwaves travel in parallel and symmetrically with respect to the laser beam. In this manner the measurement errors are reduced.

Figure 3:
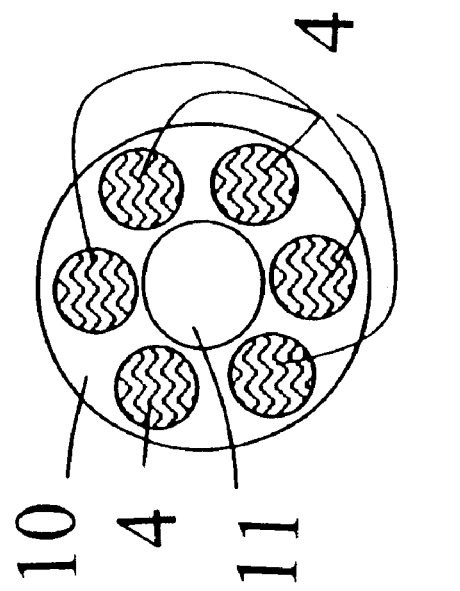
Figure 2:
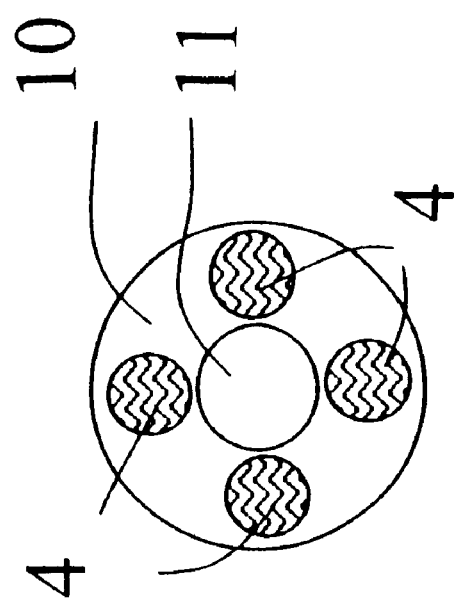

The invention will now be described in more detail with reference to the accompanying drawings, in which FIG. 1 shows a block diagram of an instrument which implements the invention method, FIGS. 2 and 3 illustrate some embodiments of the method in the form of diagrams.

FIG. 1 illustrates the laser interferometer optics 1 and 2 where the first one 1 (on the laser interferometer side) incorporates a light source and an interferometer/beam splitter, and the second one 2 incorporates a retroreflector. Fixed casings are attached to the optics, in which the sound transmitters/receivers 4a, 4b, 4c, 4d are installed. Each transmitter/receiver can transmit or receive soundwaves. The equipment also incorporates humidity sensors 6, an air pressure sensor 7, a gas analyser 8 as well as a control and calculation unit 9. The laser interferometer 1 transmits the laser beam 3 and the transmitters 4 transmit soundwaves 5.

The transmitters/receivers 4 are arranged in pairs so that the axes 5 of the soundwaves transmitted by the transmitters/receivers are symmetrical around the laser beam 3; the axes can be, for example, above and below the beam, and to the left and right of the beam. Symmetrical installation in pairs simplifies the calculations made later according to the method. The number of transmitter/receiver pairs can be customized in different applications of this invention. For example, FIGS. 2 and 3 show 4 and 6 pairs, respectively.

An embodiment according to this invention requires no special directional alignment properties for the transmitters/receivers. However, modern transmitters/receivers, where the beam angle range is only a few degrees (for example 5 to 8 degrees), provide better suppression against noise interference and can be used over longer distances. This is important in practical measurements, for example under factory conditions.

The sound frequency used is not limited to any specific value but the best results have in practice been obtained with ultrasonic frequencies, for example 50 to 100 kHz, due to their tolerance against interference. When the distance to be measured (i.e. the distance between interferometer 1 and retroreflector 2) changes, the distance between each transmitter/receiver 4 changes correspondingly. The control and calculation unit 9 receives a precise value on the distance to be measured from the laser interferometer 1.

The speed of sound is measured simultaneously with the laser interferometer measurement. The speed of sound can be measured in several ways; one of the possible alternatives is described below.

The speed of sound is measured in constantly repeating cycles which comprise the following steps:

The control and calculation unit 9 transmits a soundwave-packet via the transmitter 4a on the laser interferometer (this invention does not limit the number of oscillations in each packet; for example, 5 to 20 oscillations is adequate). These sound waves 5 travel above the laser beam 3. After a known delay, the receiver 4b on the opposite side (retroreflector side) of the laser interferometer detects the arriving soundwaves, and the time taken for the sound to travel is registered by the control and calculation unit. The control and calculation unit transmits the soundwave-packet back via the transmitter 4b to the receiver 4a. These soundwaves 5 propagate with an axis above the laser beam 3. After a known delay the receiver 4a detects the arriving soundwaves and the time taken for the sound to travel is registered by the control and calculation unit. The measurement of the time in both directions is a prerequisite for the complete elimination of the wind effect when calculating the speed of sound. After the measurement described above, a similar measurement is carried out using the opposite transmitters/receivers located symmetrically with respect to the laser beam 3. In other words, the time it takes for the sound to travel from the transmitter 4c to the receiver 4d and back from the transmitter 4d to the receiver 4c is measured, when the soundwaves now propagate with an axis below the laser beam 3. Symmetrical measurements made immediately on the opposite sides of the laser beam ensure that the measured time the sound takes to travel along the laser beam path 3, corresponds to the greatest extent with the real travel time, and that air temperature differences in the transverse direction to the laser beam are eliminated.

After the time of the soundwave has been measured with an opposed transmitter/receiver pair using the method described above, a similar measurement is made with the other transmitter/receiver pairs. If four transmitter/receiver pairs are used, the next measurements are made using the pairs to the left and right of the laser beam. The block diagram illustrates four transmitters/receivers or two pairs, but the number of transmitters/receivers can be customized in different embodiments of this invention.

When the travel time of the sound in both directions has been measured with all transmitter/receiver pairs, the cycle is repeated.

While the measurements are being made, the control and calculation unit is fed in real time with the following information:

distance reported by the laser interferometer 1 air pressure reported by the air pressure sensor 7 relative air humidity reported by the humidity sensors 6 when information about the gas concentrations in air is needed in particularly accurate measurements, the gas analyser 8 measures the concentrations of carbon dioxide and if necessary other gases in air.

Based on the information listed above, the control and calculation unit 9 first calculates the speed of sound along the laser beam path 3 and makes necessary adjustments for the effects of air pressure, relative humidity, gas concentrations, wind, and temperature gradient, and then it calculates the adjustment to the original distance estimate made by the laser interferometer, by correcting the systematic errors of the equipment and by performing the required statistical processing.

FIGS. 2 and 3 illustrate some examples of how the soundwave transmitters/receivers 4 can be located symmetrically around the laser beam. In the centre of the casing 10, there is a hole 11 where the optics of the laser interferometer are located. The hole 11 is such that the normal operation of the laser interferometer optics is not disturbed.

The invention is not limited to the preferable embodiments described above which are by way of examples only, and various alterations and modifications are possible without departure from the scope of this invention as defined in the appended claims.

What is claimed is:

1. A method for improving the accuracy of distance measurements made with a laser interferometer, comprising:

determining air temperature effect along the whole path of a laser beam emitted by the laser interferometer by measuring the speed of sound simultaneously travelling the same path, and calculating air temperature dependent adjustments on the distance measurement values by using the measured value of the sound speed.

2. A method as in claim 1 including performing said measuring the speed of sound by using in the appropriate calculations the distance measured by the laser interferometer.

3. A method as in claim 1 wherein calculating the air temperature dependent adjustments on the distance measurement values including taking into account the effects of at least one of air pressure, relative humidity, concentration of gases, temperature gradient and wind.

4. A method as in claim 1 wherein said measuring the speed of sound includes measuring the speed of sound waves travelling in both opposite directions along the whole laser beam path.

5. A method as in claim 1 wherein the speed of sound is measured by using transmitters/receivers of sound waves, said method including:

locating the transmitters/receivers on optical elements at the ends of the laser beam path so that regardless of displacement of optics the changes in both laser beam path length and sound waves travel path length are always exactly equals and so that the sound waves propagate with axes that are parallel with respect to the laser beam.

6. A method as in claim 1 wherein, for taking into account the temperature gradient in a perpendicular direction with respect to the laser beam, the speed of sound is measured by using at least two pairs of transmitters/receivers, said method including:

locating the transmitters/receivers of each pair so that the travel paths and axes of the laser beam and sound waves are adjacent each other and so that the sound waves propagate with axes that are parallel and symmetrical with respect to the laser beam.

7. A method as in claim 5 or 6 including operating said transmitters/receivers with a beam angle range of 5 to 8 degrees.

8. A method as in claim 5 or 6 including operating the transmitters/receivers at an ultrasonic frequency.

9. Apparatus for improving the accuracy of distance measurements made with a laser interferometer, comprising:

means for determining air temperature effect along the whole path of a laser beam emitted by a laser interferometer including means for measuring the speed of sound simultaneously travelling said whole path, and means for calculating air temperature dependent adjustments on the distance measurement values using the measured value of the sound speed.

10. Apparatus as in claim 9 including said laser interferometer for determining a measured distance, and means using said measured distance for calculations which are required in the measuring of sound speed.

11. Apparatus as in claim 9 wherein said means for calculating air temperature dependent adjustments on the distance measurement values includes means for taking into account the effects of at least one of air pressure, relative humidity, concentration of gases, temperature gradient and wind.

12. Apparatus as in claim 9, including optical elements at opposite ends of said whole path of said laser beam, wherein said means for measuring the speed of sound includes sound wave transmitters/receivers disposed on said optical elements so that regardless of displacement of optics at said opposite ends any changes in both laser beam path length and sound waves travel path length are always exactly equals and so that the sound waves propagate with axes that are parallel with respect to the laser beam.

13. Apparatus as in claim 9 wherein said means for measuring the speed of sound includes means for measuring the speed of sound waves travelling in both opposite directions along the whole laser beam path.

14. Apparatus as in claim 9 wherein said means for measuring speed of sound includes, for purposes of taking into account a temperature gradient in a direction perpendicular to the laser beam path, at least two pairs of transmitters/receivers located so that travel paths and axes of the laser beam and sound waves are adjacent each other and so that the sound waves propagate with axes that are parallel and symmetrical with respect to the laser beam.

* * * * *